United States Patent [19]
Copa et al.

[11] Patent Number: 4,919,815
[45] Date of Patent: Apr. 24, 1990

[54] TWO-STAGE ANAEROBIC/AEROBIC TREATMENT PROCESS

[75] Inventors: William M. Copa, Wausau; Thomas J. Vollstedt, Schofield, both of Wis.

[73] Assignee: Zimpro/Passavant Inc., Rothschild, Wis.

[21] Appl. No.: 306,195

[22] Filed: Feb. 6, 1989

[51] Int. Cl.$^5$ ............................................... C02F 3/30
[52] U.S. Cl. .................................... 210/603; 210/605; 210/616; 210/624; 210/631
[58] Field of Search ............... 210/603, 605, 616, 623, 210/624, 631, 628, 617, 615, 630, 903

[56] References Cited

U.S. PATENT DOCUMENTS

| | | | |
|---|---|---|---|
| 624,985 | 5/1899 | Scott-Moncrieff | 210/605 |
| 1,700,722 | 1/1929 | Imhoff | 210/624 |
| 2,678,915 | 5/1954 | Kalinske | 210/628 |
| 2,889,929 | 6/1959 | Kivell | 210/603 |
| 2,907,712 | 10/1959 | Eidsness et al. | 210/603 |
| 3,904,518 | 9/1975 | Hutton et al. | 210/610 |
| 3,907,672 | 9/1975 | Milne | 210/631 |
| 3,953,328 | 4/1976 | Alday | 210/628 |
| 3,977,966 | 8/1976 | Pradt et al. | 210/631 |
| 4,056,465 | 11/1977 | Spector | 210/605 |
| 4,069,148 | 1/1978 | Hutton et al. | 210/610 |
| 4,134,830 | 1/1979 | Skogman et al. | 210/603 |
| 4,162,153 | 7/1979 | Spector | 71/12 |
| 4,167,479 | 9/1979 | Besik | 210/631 |
| 4,271,026 | 6/1981 | Chen et al. | 210/650 |
| 4,315,823 | 2/1982 | Witt et al. | 210/605 |
| 4,500,429 | 2/1985 | Reimann et al. | 210/616 |
| 4,530,762 | 7/1985 | Love | 210/603 |
| 4,626,354 | 12/1986 | Hoffman et al. | 210/603 |
| 4,655,925 | 4/1987 | Tabata et al. | 210/605 |
| 4,676,906 | 6/1987 | Crawford et al. | 210/603 |
| 4,780,198 | 10/1988 | Crawford et al. | 210/151 |
| 4,810,386 | 3/1989 | Copa et al. | 210/631 |

FOREIGN PATENT DOCUMENTS 57-136991 8/1982 Japan.
62-149399 7/1987 Japan.

OTHER PUBLICATIONS

Qui, R. et al., "Sequential Anaerobic and Aerobic Treatment of Kraft Pulping Wastes", *Water Science Technology*, vol. 20, No. 1, pp. 107–120, 1988.
Rintala, J. et al., "Anaerobic-Aerobic Treatment of Thermochemical Pulping Effluents", *Tappi Journal*, pp. 201–207, Sep. 1988.

*Primary Examiner*—Peter Hruskoci
*Assistant Examiner*—Christopher Upton
*Attorney, Agent, or Firm*—Tipton L. Randall

[57] ABSTRACT

A two-stage process for purifying wastewater includes the steps of biophysical anaerobic treatment to remove the majority of the COD, followed by biophysical aerobic treatment to further purify the wastewater. A powdered adsorbent, preferably powdered activated carbon, is used with biological solids in each treatment step. Excess biophysical solids from the aerobic step are transferred to the anaerobic step for digestion. Fresh powdered adsorbent is added to the aerobic treatment step to compensate for that transferred to the anaerobic treatment step. Solids concentration in the anaerobic step is controlled by wasting solids to disposal.

27 Claims, 6 Drawing Sheets

TWO-STAGE ANAEROBIC/AEROBIC TREATMENT PROCESS

FIELD OF THE INVENTION

This invention relates to a two-stage treatment process combining biophysical anaerobic treatment followed by biophysical aerobic treatment.

DESCRIPTION OF RELATED ART

Two types of biological processes are used in the treatment of wastes, each showing particular advantages as well as certain shortcomings. The two processes are termed aerobic and anaerobic, the former requiring oxygen for respiration and waste utilization, and the latter functioning in the absence of oxygen to purify wastes.

When compared to aerobic treatment processes, anaerobic digestion has several disadvantages. First, anaerobic digestion generally results in a considerably lower degree of organic matter removal. Secondly, the activity of anaerobic bacteria has proven to be very sensitive to pH, temperature, and toxic materials such as ammonia, pyridine, and heavy metals. The methanogenic bacteria reproduce at a low rate, so full recovery of a digester following an upset condition usually takes several weeks, and often several months.

From a theoretical standpoint, however, the anaerobic treatment process is more energy efficient than aerobic processes, since (a) transfer of large quantities of air or oxygen to the waste is not required, (b) a significant portion of the organic matter is converted to methane, a useful combustible fuel gas, and (c) anaerobic treatment results in a markedly lower production of new bacterial cells, biomass that ultimately requires disposal.

Both anaerobic and aerobic treatment processes generally benefit from the addition of a powdered adsorbent, such as powdered activated carbon, to that process.

Hoffman et al. in U.S. Pat. No. 4,626,354 describe increased BOD and color removal at short residence times employing powdered activated carbon with anaerobic digestion of high strength liquors such as those from thermal conditioning of sludges.

Crawford et al. in U.S. Pat. No. 4,676,906 and U.S. Pat. No. 4,780,198 describe an hybrid high rate treatment process employing an anaerobic digestor which incorporates a sludge blanket with a filter bed which retains biosolids within the digestor. These two patents are incorporated by reference herein to the general art to which the present invention is directed.

Aerobic biological treatment with powdered carbon added to the aeration basin of the activated sludge process is described by Hutton et al. in U.S. Pat. No. 3,904,518 and U.S. Pat. No. 4,069,148. This has come to be known as the PACT ® treatment process.

Copa et al. in U.S. application Ser. No. 140,651, filed Jan. 4, 1988 and assigned to the assignee of the present invention, disclose a continuous two-stage aerobic treatment process with a powdered activated carbon contact stage following an aerobic biological treatment stage which retains most of the carbon and biological solids in the first stage. Powdered carbon is transferred from the contact stage to the aeration stage for maximum efficiency.

Spector, U.S. Pat. No. 4,056,465 and U.S. Pat. No. 4,162,153 describes a sequence of anaerobic and aerobic treatment stages for low strength municipal wastewater which prevents filamentous organism growth. The aerobic biosolids produced are recycled to the anaerobic stage or are wasted for phosphorus removal. Overall hydraulic retention time for the system is 3 hours.

Chen et al., U.S. Pat. No. 4,271,026 describe the same treatment scheme with specified F/M and BOD/P ratios controlled to enhance operation.

Combined anaerobic and aerobic treatment of waste water has been reported by Qiu, et al. in a paper entitled "Sequential Anaerobic and Aerobic Treatment of Kraft Pulping Wastes", in *Water Science Technology*, pp. 107–120, Vol. 20, 1988. Mixtures of Kraft evaporator condensate (KEC) and caustic extraction stage bleaching waste (CE) were treated by an Upflow Anaerobic Sludge Blanket process followed by aerobic activated sludge process. The combined system removed low molecular weight TOC and COD fractions efficiently but only about 20% overall total organic chloride (TOX) removal was achieved.

Reimann et al. U.S. Pat. No. 4,500,429 discloses a biological phosphorus removal process using a floating carrier for the bacteria. Wastewater encounters aerobic and anaerobic stages, in either order, with equal amounts of carrier plus bacteria exchanged between the stages. Phosphate is removed either as biological sludge from the aerobic stage or chemically precipitated from the anaerobic stage.

SUMMARY OF THE INVENTION

An object of the invention is to provide a biophysical treatment system which produces an effluent suitable for discharge to the environment.

A further object of the invention is to minimize the amount of residual solids wasted from the treatment system during the treatment process.

A further object of the invention is to generate a fuel gas from the wastewater which may be used as an energy source in the process.

Other aspects, advantages and objects of the invention will become apparent to those skilled in the art upon reviewing the following detailed description, the drawings and appended claims.

The invention is particularly suited to the treatment of intermediate strength wastes, with COD of 5,000 to 50,000 mg/l, such as found in leachates, process wastes, thermal sludge conditioning liquors, etc.

The invention comprises a two-stage process for treating COD containing wastewater comprising the steps;
(a) contacting said wastewater with anaerobic biosolids and powdered adsorbent in an anaerobic first treatment zone to form an anaerobic mixed liquor and remove a substantial portion of the COD from said wastewater;
(b) separating a fuel gas from said anaerobic mixed liquor within said first treatment zone;
(c) separating a substantial portion of the anaerobic biosolids and powdered adsorbent from said anaerobic mixed liquor by separating means within said first treatment zone to produce a first solids phase and a first aqueous phase;
(d) transferring said first aqueous phase from said first treatment zone to a second aerobic treatment zone.
(e) aerating and mixing said first aqueous phase with an oxygen-containing gas in said second treatment zone containing aerobic mixed liquor solids, composed of aerobic biosolids and powdered adsorbent, to remove a substantial portion of the remaining COD from said first aqueous phase;

(f) separating said aerobic mixed liquor solids from said thus-treated liquid to produce a second settled solids phase and a second aqueous phase;

(g) discharging said second aqueous phase to the environment or to reuse;

(h) transferring a portion of the second settled solids phase from the second treatment zone to the first treatment zone, thereby maintaining the desired concentration of aerobic biosolids and powdered adsorbent within the second treatment zone;

(i) adding sufficient powdered adsorbent to said second treatment zone to compensate for powdered adsorbent transferred to said first treatment zone in step (h); and (j) removing a sufficient amount of anaerobic mixed liquor from said first treatment zone to control solids concentration therein.

The means for separating a substantial portion of anaerobic biosolids and powdered adsorbent from the anaerobic mixed liquor is step (c) may be either a filter bed within the anaerobic digestor or a clarifier internal or external to the digestor. The preferred powdered adsorbent is powdered activated carbon.

The second aerobic treatment zone may be operated in several treatment configurations. The preferred powdered adsorbent in each case is powdered activated carbon.

In one embodiment, the aerobic treatment zone comprises an aeration tank which received a predetermined amount of first clarified aqueous phase from the first anaerobic treatment zone. The aeration tank operates in a batch treatment mode with wasted sludge for solids control returned to the first anaerobic treatment zone.

In another embodiment, the aerobic treatment zone comprises a plurality of aeration basins, each in turn receiving first aqueous phase from the anaerobic treatment zone, and each basin operating in a batch treatment mode. Wasted sludge for solids control from each aeration basin is returned to the anaerobic first treatment zone. This mode of operation can accomodate continuous flow from the first treatment zone.

In yet another embodiment, the aerobic treatment zone comprises a single aeration basin with an inlet baffle dividing the basin into a turbulent inlet section and an aeration and settling section. First aqueous phase continuously enters the turbulent inlet section at a first flow rate while alternating aeration and settling steps occur in the other section with treated wastewater withdrawn therefrom at a second flow rate greater than said first flow rate. Solids are wasted from the settling section to the first treatment zone.

In a final embodiment, the aerobic treatment zone comprises an aeration basin which continuously receives the first aqueous phase. Powdered adsorbent is added to the basin and the mixed liquor flows to a settler/clarifier where liquid effluent is removed, solids are settled and recycled to the aeration basin as well as to the anaerobic zone to control solids within the aeration basin.

DESCRIPTION OF THE PREFERRED EMBODIMENTS

Figure 1:
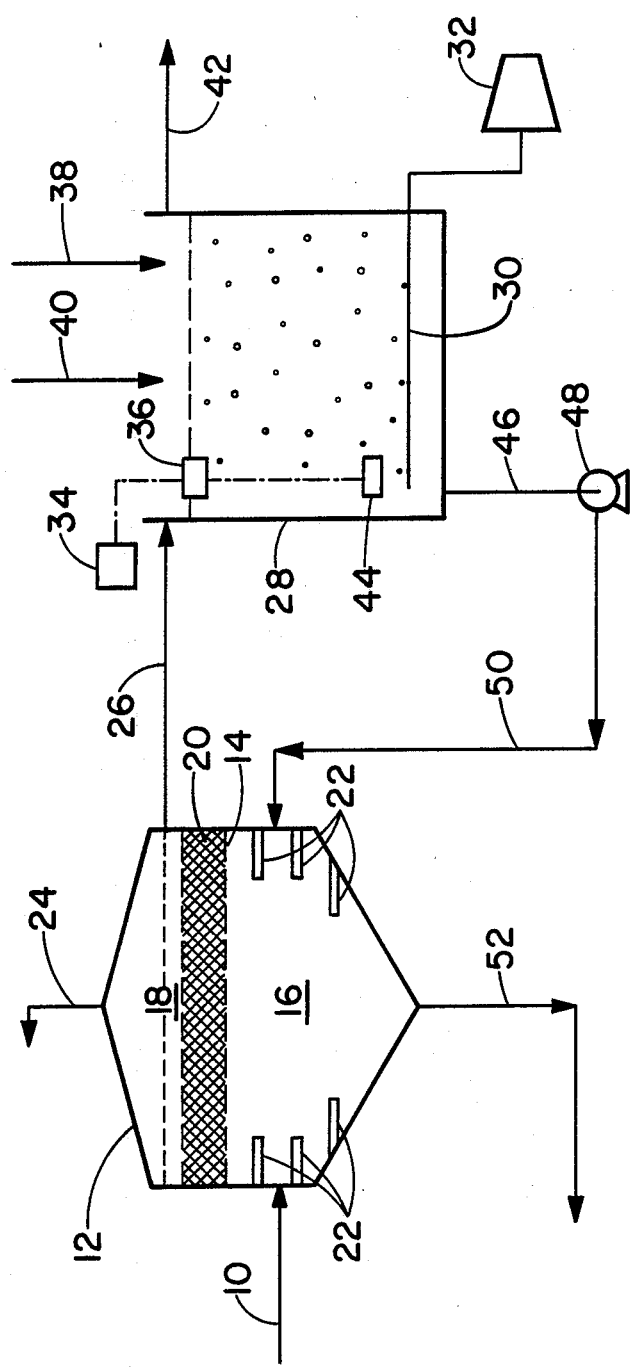
FIG. 1 is a schematic flow diagram of one embodiment of the invention in which the aerobic treatment zone comprises a single aeration basin.

Referring to FIG. 1, a wastewater containing carbonaceous COD and BOD is introduced through a conduit 10 into a first anaerobic treatment zone 12 containing anaerobic biosolids and powdered adsorbent. The wastewater may be introduced continuously or intermittently, depending upon the particular installation. Treatment zone 12 is enclosed so as to exclude atmospheric oxygen. A grating 14 separates said zone 12 into a lower digestion and mixing zone 16 and an upper digestion and clarification zone 18. A filter bed 20 of support material is located atop the grating 14 and within upper digestion zone 18. The support material may be plastic pall rings, ceramic saddles, thermoplastic rings or the like. Wastewater first enters the lower digestion and mixing zone 16 and encounters biosolids and powdered adsorbent wherein hydrogen, carbon dioxide and methane gas bubbles are generated. The temperature of the waste in the first treatment zone 12 is maintained at 25°–40° C., preferably at 35° C. Mixing of waste and biosolids plus powdered adsorbent within lower digestion zone 16 is conveniently achieved by a system of inlet and outlet ports 22, spaced around the periphery of the lower digestion zone 16. Anaerobic mixed liquor is circulated through these ports, maintaining the solids in suspension. The liquid flows upward through grating 14 and passes into and through the filter bed 20, encountering and reacting with more biosolids and powdered adsorbent. The grating and filter bed provide some degree of solids retention within said first treatment zone 12. The concentration of powdered adsorbent within zone 16 is approximately 500 to 30,000 mg/l while the biosolids concentration therein is also approximately 500 to 30,000 mg/l. An initial charge of powdered adsorbent can be added to the first treatment zone 12 to attain the desired adsorbent concentration therein during system startup. As will be described, this material is supplemented with adsorbent removed from a following aerobic treatment step.

The fuel gas generated within the upper and lower digestion zones of first treatment zone 12 collects at the top of the zone 12 and is removed by a conduit 24. Passage of anaerobic mixed liquor through the filter bed 20 results in formation of a first aqueous phase within the upper digestion and clarification zone 18 and retention of a first solids phase within the lower digestion and mixing zone 16.

In the embodiment illustrated in FIG. 1, a predetermined quantity of said first aqueous phase from the upper zone 18 is transferred via a conduit 26 into a second aerobic treatment zone 28, where the aqueous phase is mixed by aeration within said zone 28 with aerobic biosolids and powdered adsorbent contained therein. The concentration of powdered adsorbent within aerobic treatment zone 28 can range from 50 mg/l to 20,000 mg/l while the aerobic biosolids concentration may range from 10 mg/l to 50,000 mg/l, depending on the waste and the degree of treatment desired. Aeration and mixing is provided, for example, by an air sparge 30 with pressurized air delivered by a compressor 32. Mixing may be assisted by mechanical means as well. The amount of said first aqueous phase transferred can be controlled by various suitable means such as a liquid level controller 34 which is operable to close a flow control valve (not shown) or terminate operation of a pump (not shown) in response to the liquid level in the aerobic zone 28 reaching a predetermined upper limit and activating a level switch 36.

After a predetermined reaction time of about 20 minutes to about 24 hours, aeration is terminated to permit a majority of the suspended solids to settle by gravity in the aeration zone 28 and produce a treated wastewater or second clarified aqueous phase and a second settled solid phase. Additional powdered adsorbent can be added to the aeration zone 28 via a conduit 38 during the reaction period after the predetermined amount of wastewater has been introduced into the second treatment zone 28.

To accelerate the settling of these solids, a flocculation aid can be added via a conduit 40 to the aeration zone 28. The flocculant aid preferably is added shortly before aeration and agitation are terminated in order to ensure homogeneous mixing with the partially-treated wastewater without causing premature settling of the solids.

While various suitable flocculant aids can be used, cationic polymers, such as Percol 787 or Percol 788 marketed by Allied Colloids, Inc., Suffolk, Va., are preferred. These materials are high molecular weight cationic copolymers of a quaternary acrylate salt and acrylamide. The amount of flocculant aid added is sufficient to promote the desired settling of the solids. Generally, this amount is about 0.1 to about 10 mg of flocculant aid per liter of partially-treated wastewater.

After completion of the settling period, a predetermined amount of the second clarified aqueous phase is withdrawn from the aeration zone 28 via a conduit 42. This can also be controlled by various suitable means such as a liquid level controller 34 which is operable to terminate the operation of a pump (not shown) in response to the liquid level in the aeration zone 28 dropping to a predetermined lower limit and activating a level switch 44.

In order to control the solids concentration within the aeration zone 28 as aerobic biosolids increase, a portion of the settled second solids phase (adsorbent and biologically active solids) is withdrawn from the aeration zone 28 via a conduit 46 and a pump 48 and returned to said first anaerobic treatment zone 12 via a conduit 50 for digestion and disposal. The settled solids phase is withdrawn during the separating or discharging steps within the aeration zone 28. To compensate for the transfer of powdered adsorbent from zone 28 to zone 12, additional fresh powdered adsorbent is added to the aeration basin 28 from a conduit 38 during the aeration and mixing step therein.

Control of solids concentration within first anaerobic digestion zone 12 is achieved by removal of a portion of the anaerobic mixed liquor from the lower digestion zone 16 via a conduit 52.

Figure 2:
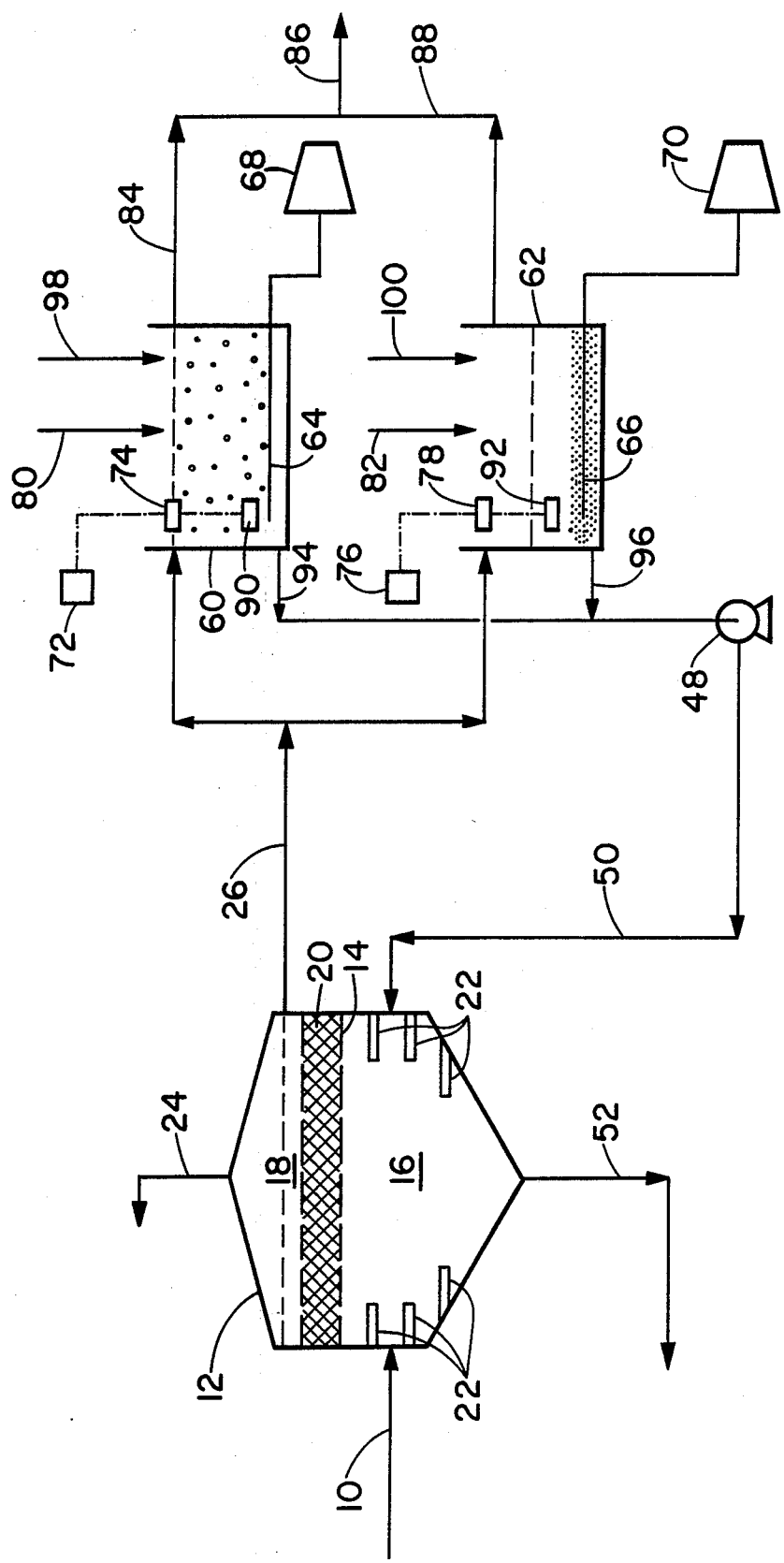
FIG. 2 is a schematic flow diagram of another embodiment of the invention in which the aerobic treatment zone comprises a plurality of aeration basins.

In the embodiment illustrated in FIG. 2, the first anaerobic treatment zone is arranged and operates in the same manner as described above. Accordingly, components common with those illustrated in FIG. 1 are designated with the same reference numerals.

The first aqueous phase flows from the upper digestion zone 18 of first anaerobic treatment zone 12, through a conduit 26 and subsequently into a selected one of a plurality (e.g., two) separate aeration basins 60 and 62. Like the aeration basin 28 described above, each aeration basin 60 and 62 has aeration and mixing means, for example air sparges 64 and 66, supplied with pressurized air delivered by compressors 68 and 70, for mixing and contacting said first aqueous phase with aerobic biosolids and powdered adsorbent contained therein. Mixing may be assisted by mechanical means as well. The concentration of biosolids and powdered adsorbent within the basins 60 and 62 can vary over the same range as described for the aeration basin 28 above.

The first aqueous phase from first anaerobic treatment zone 12 first flows into one of the aeration basins, for example, the basin 60, for a predetermined fill period. The fill period can be controlled by suitable level control means, such as a controller 72, which terminates flow into the basin 60 and diverts it to the basin 62 when the level of liquid in the basin 60 reaches a predetermined upper limit and activates a level switch 74. The basin 62 has similar control means, a controller 76 and a level switch 78, for diverting the flow back to the basin 60 when the liquid level in the basin 62 reaches a predetermined upper limit. Aeration of the biomass, adsorbent and incoming first aqueous phase in each tank can be carried out during and/or after completion of the respective fill period.

Aeration and mixing of the aerobic mixed liquid is terminated after a predetermined reaction time, ranging from about 20 minutes to about 24 hours, and, if used, a flocculant aid is added via the conduits 80 or 82, respectively, shortly before termination of the aeration and mixing period. Following the aeration period in the basin 60, suspended solids are allowed to settle by gravity to produce a clarified, substantially solids free, second aqueous phase and a second settled solids phase. Meanwhile, first aqueous phase is flowing into the other aeration basin 62 for a predetermined fill period.

After completion of the settling period, a predetermined amount of the second aqueous phase is withdrawn from the basin 60 via the conduits 84 and 86 and disposed or reused. The basin 60 remains idle until completion of the fill period for the basin 62, at which time the first aqueous phase from first treatment zone 12 is diverted back to the basin 60. After completion of the settling period in the basin 62, a predetermined amount of the second aqueous phase is withdrawn through the conduits 88 and 86. Withdrawal of the second aqueous phase from each basin is controlled by the level switches 90 and 92, terminating the withdrawal when the liquid level drops to a predetermined lower limit. These fill, aerate and mix, settle and draw steps are alternately repeated in each aeration basin.

As in the embodiment described above, a portion of the solids phase is withdrawn from the basins 60 and 62 by a pump 48, via the respective conduits 94 and 96 and transferred to the first anaerobic treatment zone 12 via a conduit 50. Withdrawal of these solids, after completion of the draw cycle in each tank, can be controlled as described above. To compensate for powdered adsorbent removed from the aeration basins 60 and 62, fresh powdered adsorbent is added via the conduits 98 and 100 respectively, to each basin during the aeration and mixing period.

With this flow scheme, the process can be operated continuously and the fill periods for the basins adjusted so that the fill, agitate, settle and draw steps for one tank can be completed before it is time to commence the fill cycle again. Thus, each basin operates as a batch unit and the agitation and settling times can be varied as required to provide the desired treatment and settling. It should be understood that three or more aeration basins can be used, if desired, to provide an additional latitude in the length of the fill, aerate and mix, settle and draw steps.

Figure 3:
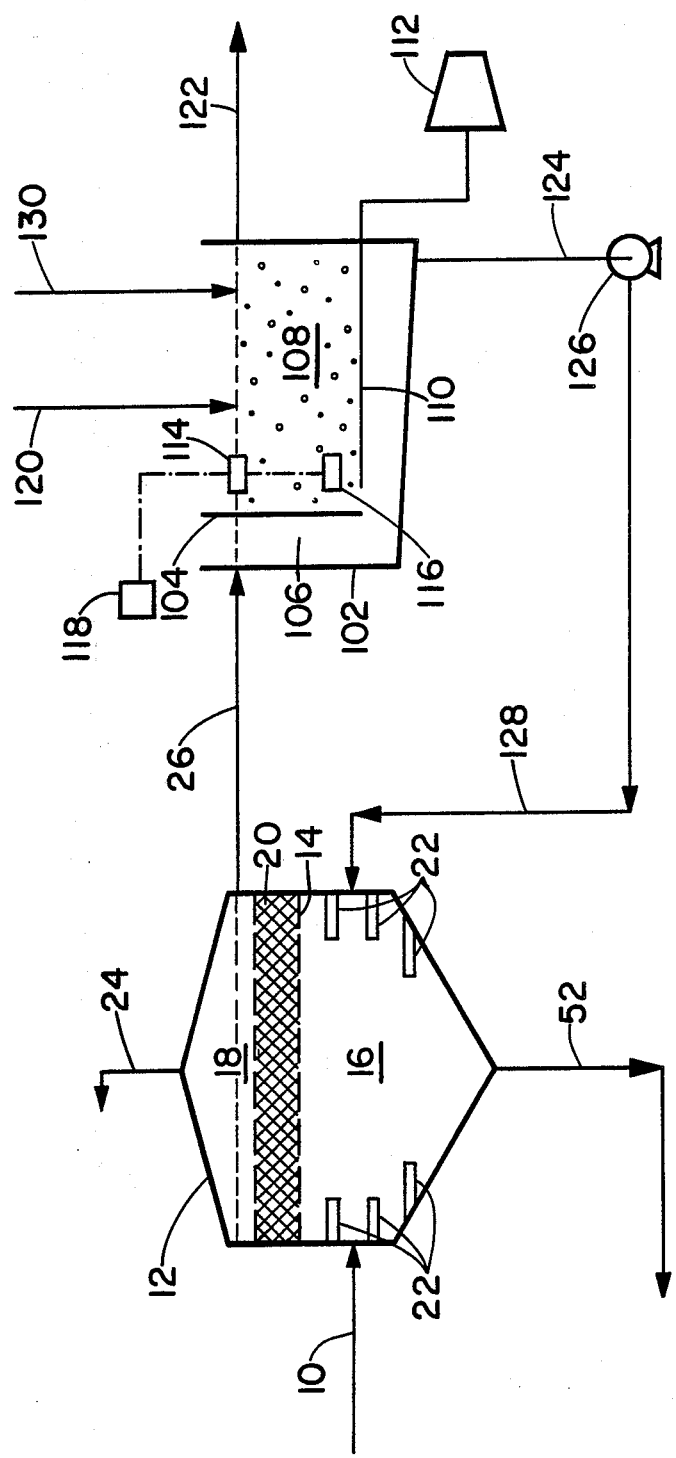
FIG. 3 is a schematic flow diagram of another embodiment of the invention in which the aerobic treatment zone comprises a single aeration basin containing a baffle near the basin inlet.

In the embodiment illustrated in FIG. 3, the first anaerobic treatment zone again is arranged and operates in the same manner as described above, with components common to FIGS. 1 and 2 again designated with the same reference numerals.

The first aqueous phase from the upper digestion zone 18 of first treatment zone 12 flows through a conduit 26 into an aeration basin 102 at a first flow rate approximately the same as the flow rate of wastewater flowing through the inlet conduit 10. The aeration basin 102 includes a baffle 104 defining a turbulent inlet section 106 and an aeration and settling section 108 both inside the aeration basin 102. The two sections, 106 and 108, are in fluid connection beneath said baffle 104. The incoming wastewater passes from the tubulent section 106, beneath the baffle 104, and into the aeration and settling section 108.

The aeration basin 102 contains a mixture of aerobic biological solids and powdered adsorbent to treat incoming wastewater. The concentration of biosolids and powdered adsorbent are within the range described above. The aeration and settling zone 108 contains a sparge 110 supplied with an oxygen-containing gas (i.e. air) from a compressor 112. The zone 108 also contains upper and lower level control switches 114 and 116 respectively, connected to a controller 118. Mixing in the zone 108 may be assisted by mechanical means located therein.

As first aqueous phase flows into the aeration basin 102, aeration and mixing of the aerobic mixed liquor continues until the liquid level reaches a predetermined upper limit and activates the upper level switch 114. Aeration and mixing cease and a flocculant aid may be added from a conduit 120 to assist in settling the suspended solids within the zone 108. The baffle 104 prevents incoming liquid from disturbing the settling step. This settling step produces a second settled solids phase and a second clarified liquid phase. The liquid phase is withdrawn from the aeration basin 102 via a conduit 122 at a second rate greater than the rate of incoming wastewater. Withdrawal is terminated when the liquid level drops to a predetermined lower limit which activates the level switch 116. The duration of the reaction step in the aeration basin 102 will depend on both the size of the aeration basin and the flow rate of the first aqueous phase into the aeration basin.

Control of solid concentration within the aeration basin 102 is achieved by removing a portion of the second settled solids phase from the lower portion of the settling zone 108 during the settling step. The settled solids are withdrawn through a conduit 124 and a pump 126, which delivers the solids via a conduit 128 to the first anaerobic digestion zone for digestion and disposal.

To compensate for powdered adsorbent transferred from the aeration basin 102, fresh adsorbent is added to the basin 102, by a conduit 130, during the aeration and mixing step therein. The powdered adsorbent may be added to the aeration zone 108 or to the turbulent inlet zone 106. The amount of adsorbent added will depend upon the amount of solids transferred to the anaerobic digestor and the degree of treatment desired for the wastewater.

Figure 4:
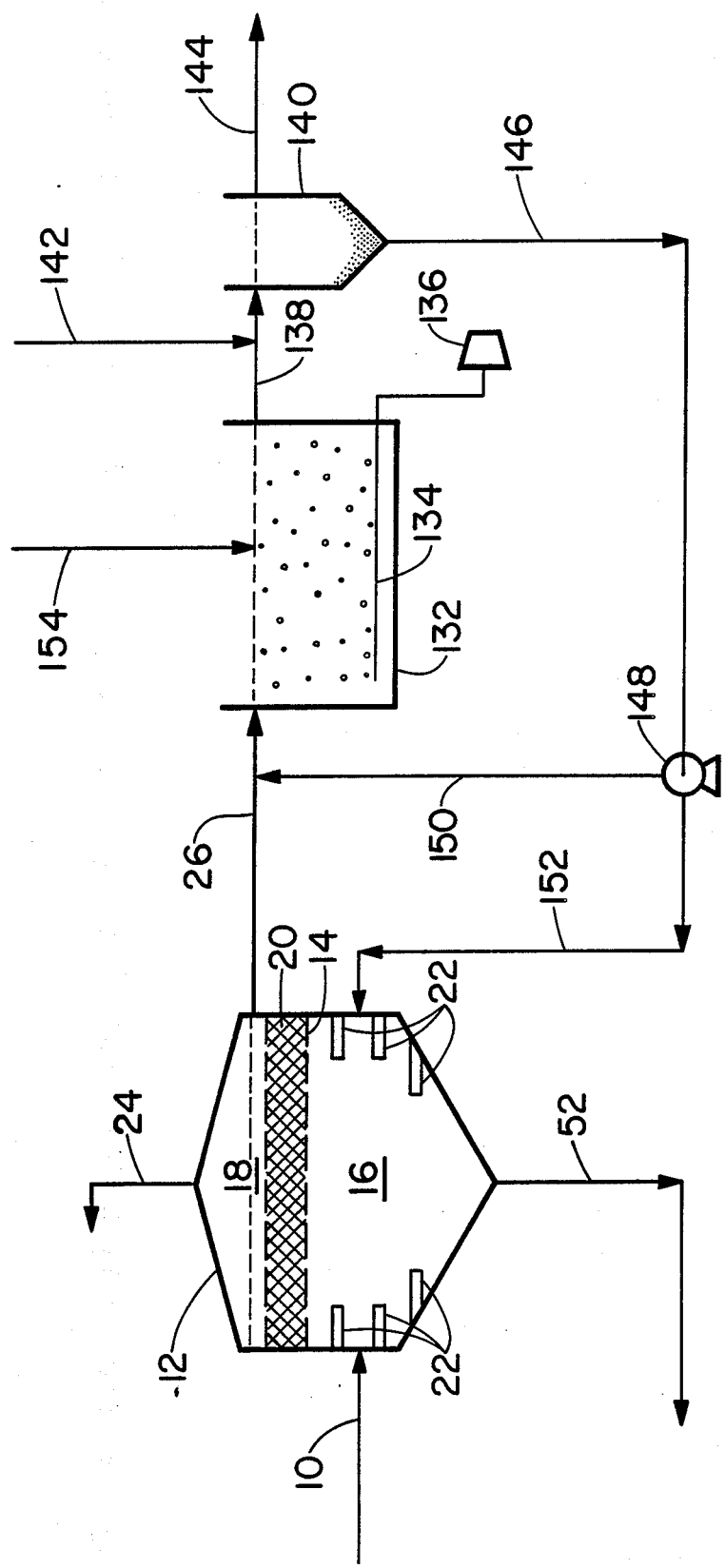
FIG. 4 is a schematic flow diagram of another embodiment of the invention in which the aerobic treatment zone comprises a single aeration basin followed by a separate clarifier.

In the embodiment illustrated in FIG. 4, the first anaerobic treatment zone again is arranged and operates in the same manner as described above, with components common to FIGS. 1-3 again designated with the same reference numeral.

The first aqueous phase from the upper digestion zone 18 of the first treatment zone 12 flows continuously through a conduit 26 into an aeration basin 132. This basin 132 contains a mixture of aerobic biosolids and powdered adsorbent which is continuously aerated by an air sparge 134 employing pressurized air from a compressor 136. Mixing may be assisted by mechanical means as well. The concentration of biosolids and powdered adsorbent are within the range described above. The resulting aerobic mixed liquor flows from the basin 132 via a conduit 138 to a clarifier 140. An optional flocculant aid may be added to the mixed liquor in the conduit 138 from a conduit 142 to assist in the settling of solids. Within the clarifier 140 the mixed liquor separates and settles to form a second solids phase and a second liquid phase, the latter overflowing from the clarifier 140 to discharge via a conduit 144.

Second solids phase is pumped from the bottom of the clarifier 140 via a conduit 146 and a pump 148. The solids phase is returned to the aeration basin 132 via a conduit 150 to maintain the desired concentration of biosolid and powdered adsorbent therein. As additional biosolids accumulate within the aerobic treatment zone, a portion of the second solids phase is transferred from the recycle conduit 146 and the pump 148 through a conduit 152 to the anaerobic digestion zone 12 for digestion and disposal. To compensate for the powdered adsorbent transferred from the aerobic treatment zone, fresh powdered adsorbent is added to the aeration basin 132 from a conduit 154, thereby maintaining the desired concentration of powdered adsorbent within the aeration basin 132.

Figure 5:
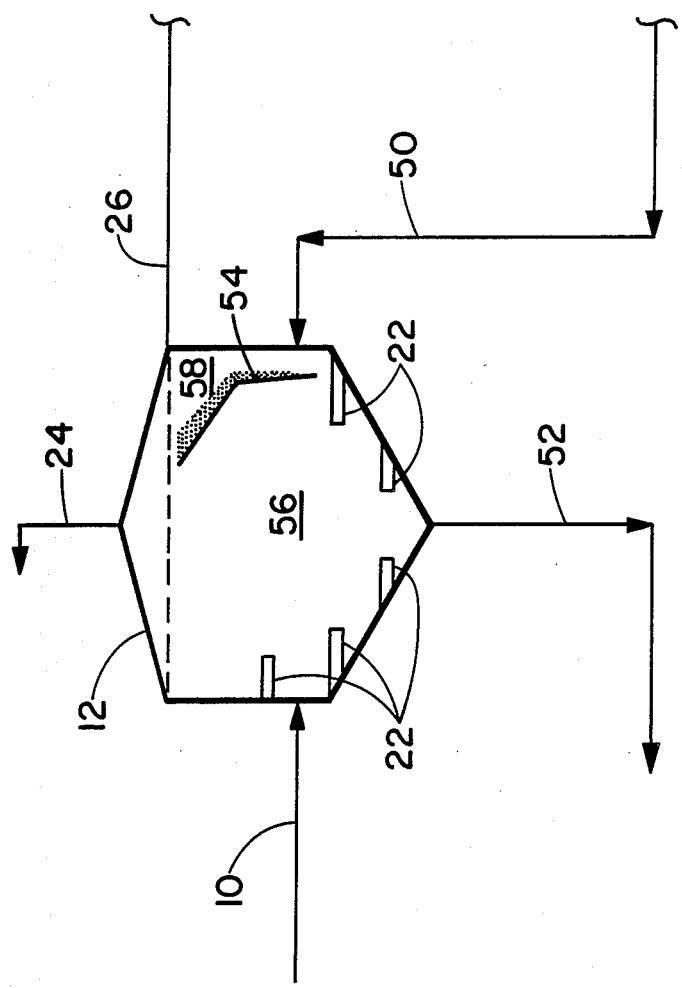
FIG. 5 is a partial schematic flow diagram of an alternative embodiment of the invention in which the anaerobic treatment zone contains an internal clarification zone.

In the embodiment illustrated in FIG. 5, an alternative configuration for the first anaerobic treatment zone is shown. Accordingly, components common with those illustrated in FIGS. 1-4 are designated with the same reference numerals.

Wastewater is introduced through a conduit 10 into a first anaerobic treatment zone 12 containing anaerobic biosolids and powdered adsorbent. Wastewater may be introduced continuously or intermittently depending upon the particular installation. Treatment zone 12 is enclosed so as to exclude atmospheric oxygen. A baffle 54 separates said zone 12 into a mixing digestion zone 56 and a quiescent clarifier zone 58. Wastewater first enters the mixing digestion zone 56 and encounters biosolids and powdered adsorbent wherein hydrogen, carbon dioxide and methane gas are generated. Mixing of waste, biosolids and powdered adsorbent within the digestion zone 56 is conveniently achieved by a system of inlet and outlet ports 22, spaced around the periphery of the digestion zone 56. Anaerobic mixed liquor is circulated through these ports, maintaining the solids in suspension. The fuel gas generated within both mixing and quiescent zones collects at the top of the zone 12 and is removed by a conduit 24. The liquid and solids from within zone 56 flow up and over the baffle 54 and into the quiescent zone 58 where some degree of solids separation occurs.

The separation within the quiescent clarifier zone 58 results in formation of a first aqueous phase and a first settled solids phase therein. The settled solids phase flows by gravity back to the mixing and digestion zone 56 while the first liquid phase is transferred to the aerobic process for further treatment via a conduit 26.

As with the previously described embodiments, excess biosolids and powdered adsorbent from the aerobic treatment zone is returned via a conduit 50 to the anaerobic treatment zone 12 for digestion and disposal. Solids concentration within the treatment zone 12 is controlled by wasting anaerobic mixed liquor from the digestion zone 56 via a conduit 52.

Figure 6:
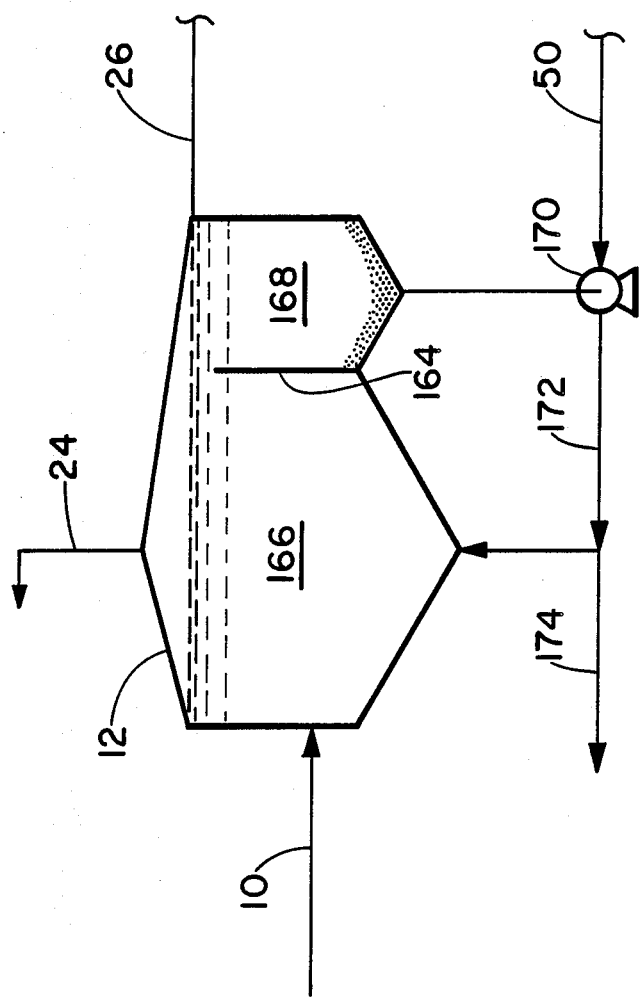
FIG. 6 is a partial schematic flow diagram of another alternative embodiment of the invention in which the anaerobic treatment zone has a adjacent clarifier to separate and return biophysical solids to the digestion zone.

Another embodiment for this first anaerobic treatment zone is shown in FIG. 6. Accordingly, components common with those illustrated in FIGS. 1–5 are designated with the same reference numerals.

Wastewater is introduced continuously or intermittently through a conduit 10 into a first anaerobic treatment zone 12 containing anaerobic biosolids and powdered adsorbent. The treatment zone 12 is enclosed so as to exclude atmospheric oxygen. A baffle 164 separates said zone into a mixing digestion zone 166 and a quiescent clarifier zone 168.

Wastewater first enters the digestion zone 166 and encounters biosolids and powdered adsorbent wherein hydrogen, carbon dioxide and methane gas are generated. The wastewater, biosolids and powdered adsorbent, called anaerobic mixed liquor, are mixed by pumping settled solids from the bottom of the settler zone 168 with a pump 170, and a conduit 172.

The fuel gas generated within both mixing and quiescent zones collects at the top of the zone 12 and is removed by a conduit 24. The mixed liquor overflows the baffle 164 from the zone 166 into the settler zone 168. The solids settle and a clarified liquid phase is formed. The settled solids are returned to the digestion mixing zone 166 via a pump as described above to maintain the desired concentration of solids within the zone 166. The first liquid phase is removed from the clarifier zone 168 via a conduit 26 and delivered to the aerobic treatment portion of the system.

As with the previously described embodiments, excess biosolids and powdered adsorbent from the aerobic treatment zone are returned to the anaerobic treatment zone via a conduit 50, connected to the pump 170 which pumps solids slurry to the zone 166. Solids concentration within the treatment zone 12 is controlled by wasting settled anaerobic solids from the clarifier 168 via the pump 170 and the conduits 172 and 174.

EXAMPLE

A landfill leachate of intermediate strength was treated by the combined anaerobic/aerobic treatment process. Gross amounts of heavy metals were removed from the leachate prior to treatment by adjusting the leachate pH to 9 with lime, which precipitated the metals as hydroxides.

For either anaerobic or aerobic biophysical treatment, with powdered carbon for example, the important process parameters which can be varied to achieve the desired degree of treatment for a wastewater include:

1. Hydraulic Detention Time (HDT), which is treatment vessel volume/influent feed rate.
2. Solids Retention Time (SRT) which is the average time the solids, powdered carbon and biomass, are retained within the treatment vessel.
3. Mixed Liquor Carbon Suspended Solids (MLCSS) which is the mass of carbon present in the mixed liquor.
4. Carbon Dose (CD) which is the mass of fresh carbon added per unit time/influent feed rates.

HDT can vary from a few hours to several days for both anaerobic and aerobic process. SRT for anaerobic systems are long, from 20–500 days, while aerobic systems employ shorter times of 2–20 days. MLCSS are maintained in the 4,000–40,000 mg/l range for both systems. CD will depend on the degree of treatment required.

The anaerobic bench scale unit contained a 1.6 liter volume gas-tight upright cylindrical digestor. A recirculation outlet at cylinder mid-height was connected to a peristaltic pump which drew anaerobic mixed liquor from the outlet and returned it to an inlet at the cylinder bottom to effect mixing. A feed inlet was located below the level of the recycle outlet and an effluent outlet was located above the level of the recycle out. The whole apparatus was housed in a constant temperature chamber maintained at 35° C. Digestor gas collected at the top of the cylinder was transferred via tubing to gas reservoirs filled with $Na_2SO_4/H_2SO_4$ solution, located outside the chamber.

Influent leachate flowed through the inlet into the cylindrical digestor where it was mixed with powdered activated carbon and anaerobic biological solids. The anaerobic mixed liquor was agitated by means of the recirculation pump for a time period sufficient to affect decomposition of a significant amount of the BOD and COD of the leachate. The treated leachate was separated from the anaerobic biological solids by halting the recirculation pump for a time period sufficient to allow solids to settle and a clarified aqueous phase to form. The aqueous phase was withdrawn through the effluent line for further treatment. A portion of the settled solids was then withdrawn by the recirculation pump to control solids within the digestor. Additional leachate and aerobic mixed liquor solids from the second aerobic treatment stage were added to the digestor and the contents agitated by the recirculation pump. Digestor gas was collected over the $Na_2SO_4/H_2SO_4$ solution and measured 3 times a week to monitor system performance.

The aerobic bench scale unit contained a 4-liter volume, upright cylinder fitted with an aeration stone and compressed air supply, plus a mechanical mixer. The aerobic unit operated in a batch mode with a cycle duration of 24 hours. The aerobic mixed liquor, composed of anaerobic unit effluent, aerobic biosolid and powdered activated carbon, was aerated and mixed for 22 hours. To control solids within the aerobic unit, a portion of the aerobic mixed liquor was removed from the aeration cylinder at the end of the aeration period.

These solids were added to the anaerobic treatment stage for digestion and disposal.

The mixed liquor in the aeration cylinder was allowed to settle for approximately 2 hours by ceasing the aeration and mixing, then a specific amount of the treated, clarified liquid was drawn off as effluent. Partially treated liquid from the anaerobic stage was added to the aeration cylinder plus sufficient fresh powdered carbon to compensate for that transferred to the anaerobic stage. The aeration and mixing resumed and the treatment cycle was repeated. After an initial start up period, the two treatment stages were operated at the conditions shown in Table 1. The only powdered carbon added to the anaerobic step was from waste solids removed from the aerobic treatment step. Excellent treatment results were obtained for both study periods, A and B.

TABLE 1

| Combined Anaerobic/Aerobic Biophysical Treatment | | |
|---|---|---|
| Operating Parameter | Period A | Period B |
| Anaerobic Step: | | |
| HDT, days | 4 | 4 |
| SRT, days | >100 | >100 |
| CD, mg/l | 0* | 0* |
| Aerobic Step: | | |
| HDT, days | 2 | 2 |
| SRT, days | 10 | 12 |
| CD, mg/l | 1200 | 600–1200 |
| Study Period, days | 44 | 33 |
| COD | | |
| Feed, mg/l | 16,500 | 16,500 |
| Effluent, mg/l | 450 | 253 |
| % Reduction | 97.3 | 98.5 |
| BOD$_5$ | | |
| Feed, mg/l | 12,000 | 12,000 |
| Effluent, mg/l | 29 | 12 |
| % Reduction | 99.8 | 99.9 |
| NH$_3$—N | | |
| Feed, mg/l | 315 | 315 |
| Effluent, mg/l | 38 | <2 |
| % Reduction | 88 | >99 |
| Phenol | | |
| Feed, mg/l | 9.8 | 9.8 |
| Effluent, mg/l | 0.96 | <0.09 |
| % Reduction | 90 | >96 |

*The only carbon added to the anaerobic step was from the aerobic step.

We claim:

1. A two-stage process for treating wastewater containing a COD of 5,000–50,000 mg/l comprising the steps;
   (a) contacting said wastewater with anaerobic biosolids and powdered adsorbent in an anaerobic first treatment zone to form an anaerobic mixed liquor and remove a substantial portion of the COD from said wastewater;
   (b) separating a fuel gas from said anaerobic mixed liquor within said first treatment zone;
   (c) separating a substantial portion of the anaerobic biosolids and powdered adsorbent from said anaerobic mixed liquor by separating means within said first treatment zone to produce a first solids phase and a first aqueous phase;
   (d) transferring said first aqueous phase from said first treatment zone to a second aerobic treatment zone.
   (e) aerating and mixing said first aqueous phase with an oxygen-containing gas in said second treatment zone containing aerobic mixed liquor solids, composed of aerobic biosolids and powdered adsorbent, to remove a substantial portion of the remaining COD from said first aqueous phase;
   (f) separating said aerobic mixed liquor solids from said thus-treated liquid to produce a second settled solids phase and a second aqueous phase;
   (g) discharging said second aqueous phase to the environment or to reuse;
   (h) transferring a portion of the second settled solids phase from the second treatment zone to the first treatment zone, thereby maintaining the desired concentration of aerobic biosolids and powdered adsorbent within the second treatment zone;
   (i) adding sufficient powdered adsorbent to said second treatment zone to compensate for powdered adsorbent transferred to said first treatment zone in step (h); and
   (j) removing a sufficient amount of anaerobic mixed liquor from said first treatment zone to control solids concentration therein.

2. A process according to claim 1 wherein said anaerobic first treatment zone comprises a lower digestion and mixing zone and an upper digestion and clarification zone, and said separating means of step (c) comprises a filter bed of support material within said upper digestion and clarification zone.

3. A process according to claim 1 wherein said anaerobic first treatment zone comprises a mixing digestion zone and a quiescent clarifier zone, and said separating means of step (c) comprises a baffle separating said mixing zone from said quiescent zone allowing liquid/solids separation within said quiescent zone.

4. A process according to claim 1 wherein said powdered adsorbent is powdered activated carbon.

5. A process according to claim 1 wherein a predetermined amount of first aqueous phase is transferred from said first treatment zone to said second treatment zone.

6. A process according to claim 5 wherein said second aerobic treatment zone comprises an aeration basin containing aeration and mixing means, said aerating and mixing step (e) occurring during and/or after the transfer of said predetermined amount of said first aqueous phase to the aeration basin, said separating step (f) and discharging step (g) occurring after completion of the aerating and mixing step (e).

7. A process according to claim 6 wherein said transferring step (h) of a portion of the second settled solids phase to the first treatment zone occurs during said separating step (f) or discharging step (g) within said aeration basin.

8. A process according to claim 6 wherein said powdered adsorbent adding step (i) occurs during said aerating and mixing step (e) in said aeration basin.

9. A process according to claim 6 wherein said mixing step (e) is assisted by mechanical mixing means within said aeration basin.

10. A process according to claim 1 wherein said first aqueous phase is continuously transferred from said first treatment zone to said second treatment zone.

11. A process according to claim 10 wherein said second aerobic treatment zone comprises a plurality of aeration basins, each basin containing an aeration means;
   in step (d) said first aqueous phase flows from said first treatment zone to one of said basins for a predetermined fill period then to a different one of said basins for a predetermined fill period and this sequence is continued;

in step (e) said aerating and mixing is carried out in each of said basins during and/or after said filling period therefor;

in step (f) said separating is carried out in each basin after termination of said aerating and mixing period therefor;

in step (g) said discharging of said second aqueous phase from each of said basins occurs after completion of said separating step therefor and before commencement of the flow of said first aqueous phase from said first treatment zone thereinto.

12. A process according to claim 11 wherein step (d) is continued until the liquid level of said first aqueous phase in each of said basins reaches a predetermined upper level.

13. A process according to claim 11 wherein step (g) is continued until the liquid level of said second aqueous phase in each of said basins drops to a predetermined lower limit.

14. A process according to claim 11 wherein transferring step (h) of said second solids phase to said first treatment zone occurs during said separating step (f) or said discharging step (g) within each of said basins.

15. A process according to claim 11 wherein powdered adsorbent adding step (i) occurs during said transferring step (d) or aerating and mixing step (e) within each of said basins.

16. A process according to claim 11 wherein said mixing and aerating step (e) is assisted by mechanical mixing means within each of said basins.

17. A process according to claim 10 wherein said second treatment zone comprises an aeration basin including an inlet section and an aerating and mixing section substantially isolated from and in continuous fluid communication with said inlet section;

in transferring step (d) said first aqueous phase continuously flows from said first treatment zone into said inlet section at a first flow rate and passes therefrom into said aerating and mixing section;

in steps (e) and (f) said aerating and mixing and said separating steps are carried out in said aerating and mixing section; and said separating step (f) and discharging step (g) occurring after completion of the aerating and mixing step (e); and in step (g) said second aqueous phase is discharged from said aerating and mixing section at a second flow rate greater than said first flow rate until the liquid level of said second aqueous phase in said basin drops to a predetermined lower limit.

18. A process according to claim 17 wherein transferring step (h) of said second solids phase to said first treatment zone occurs during said separating step (f) or said discharging step (g) within said aeration basin.

19. A process according to claim 17 wherein powdered adsorbent adding step (i) occurs during said aerating and mixing step (e) within said aeration basin.

20. A process according to claim 19 wherein said powdered adsorbent is added to said inlet section of said aeration basin.

21. A process according to claim 17 wherein said mixing and aerating step (e) is assisted by mechanical mixing means within said aeration basin.

22. A process according to claim 10, wherein said second treatment zone comprises an aeration basin containing an aeration and mixing means followed by a settler/clarifier basin;

in step (d) said first aqueous phase continuously flows from said first treatment zone into said aeration basin;

in step (e) said aeration and mixing occurs continuously within said aeration basin;

in step (f) said aerobic mixed liquor continuously flows from said aeration basin to said settler/clarifier basin wherein said separating occurs, in step (g) said second aqueous phase is discharged from said settler/clarifier basin; and in step (h) a second portion of said second settled solids phase from said settler/clarifier basin is recycled to said aeration basin in addition to said portion which is transferred to said first treatment zone.

23. A process according to claim 22 wherein said powdered adsorbent is added to said aeration basin.

24. A process according to claim 22 wherein said aerating and mixing step (e) is assisted by mechanical mixing means within said aeration basin.

25. A process according to claim 1 wherein said first anaerobic treatment zone contains 500 to 30,000 mg/l of biosolids and 500 to 30,000 mg/l of powdered adsorbent.

26. A process according to claim 1 wherein said second aerobic treatment zone contains 10 to 50,000 mg/l of biosolids and 50 to 20,000 mg/l of powdered adsorbent.

27. A two-stage process for treating wastewater containing a COD of 5,000–50,000 mg/l comprising the steps;

(a) contacting said wastewater with anaerobic biosolids and powdered activated carbon in an anaerobic first treatment zone to form an anaerobic mixed liquor and remove a substantial portion of the COD from said wastewater;

(b) separating a fuel gas from said anaerobic mixed liquor within said first treatment zone;

(c) separating a substantial portion of the anaerobic biosolids and powdered activated carbon from said anaerobic mixed liquor by separating means within said first treatment zone to produce a first solids phase and a first aqueous phase;

(d) transferring continuously said first aqueous phase from said first treatment zone to an aeration basin;

(e) aerating and mixing continuously said first aqueous phase with an oxygen-containing gas in said aeration basin containing aerobic mixed liquor solids composed of aerobic biosolids and powdered activated carbon, to remove a substantial portion of the remaining COD from said first aqueous phase;

(f) transferring continuously said aerobic mixed liquor solids and thus-treated first aqueous phase to a settler/clarifier basin;

(g) settling said mixture of solids and liquid to form a settled second solids phase and a clarified second aqueous phase;

(h) discharging said second aqueous phase to the environment or to reuse;

(i) recycling at least a portion of said second settled solids phase from said clarifier to said aeration basin to maintain a desired concentration of biosolids and powdered activated carbon therein;

(j) transferring a portion of said second settled solids phase from said clarifier to said first anaerobic treatment zone thereby maintaining the desired concentration of biosolids and powdered activated carbon in said aeration basin;

(k) adding sufficient powdered activated carbon to said aeration basin to compensate for powdered activated carbon transferred to said first treatment zone in step (j); and (l) removing a sufficient amount of anaerobic mixed liquor from said first treatment zone to control solids concentration therein.

* * * * *